US011699934B2

United States Patent
Mahler et al.

(10) Patent No.: US 11,699,934 B2
(45) Date of Patent: Jul. 11, 2023

(54) END SHIELD FOR A BRUSHLESS ELECTRIC MOTOR

(71) Applicant: Hilti Aktiengesellschaft, Schaan (LI)

(72) Inventors: Thomas Mahler, Laage (DE); Manfred Jakob, Kaufering (DE); Torsten Tussing, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 1263 days.

(21) Appl. No.: 16/304,567

(22) PCT Filed: Apr. 26, 2017

(86) PCT No.: PCT/EP2017/059877
§ 371 (c)(1),
(2) Date: Nov. 26, 2018

(87) PCT Pub. No.: WO2017/207173
PCT Pub. Date: Dec. 7, 2017

(65) Prior Publication Data
US 2019/0296603 A1 Sep. 26, 2019

(30) Foreign Application Priority Data

May 30, 2016 (EP) .................................. 16171876

(51) Int. Cl.
*H02K 5/15* (2006.01)
*H02K 11/215* (2016.01)
(Continued)

(52) U.S. Cl.
CPC ............... *H02K 5/15* (2013.01); *H02K 3/522* (2013.01); *H02K 5/1732* (2013.01); *H02K 5/207* (2021.01);
(Continued)

(58) Field of Classification Search
CPC .......... H02K 11/215; H02K 5/15; H02K 5/16; H02K 5/161; H02K 5/173; H02K 5/1732
See application file for complete search history.

(56) References Cited

U.S. PATENT DOCUMENTS

2009/0261693 A1 10/2009 Debraillly
2011/0163621 A1* 7/2011 Kim .................... H02K 5/1675
310/90
(Continued)

FOREIGN PATENT DOCUMENTS

CN 101189781 A 5/2008
CN 101401280 A 4/2009
(Continued)

OTHER PUBLICATIONS

Machine Translation of WO 2017008796 A1 (Year: 2017).*
International Search Report of PCT/EP2017/059877, dated Jul. 4, 2017.

*Primary Examiner* — Thomas Truong
(74) *Attorney, Agent, or Firm* — Davidson, Davidson & Kappel, LLC

(57) ABSTRACT

A non-output-side end shield (100) for a brushless electric motor (500) is provided, including a centrally arranged bearing seat (110) for accommodating a non-output-side rotor bearing (510) for a rotor shaft (560) of the brushless electric motor (500), the non-output-side end shield (100) including a sensor receptacle (150), which is used as a carrier for a sensor circuit board (550) for detecting the rotational position of the rotor shaft (560), the non-output-side end shield (100) and the sensor receptacle (150) being formed together as a one-part component.

20 Claims, 6 Drawing Sheets

(51) Int. Cl.
*H02K 3/52* (2006.01)
*H02K 5/173* (2006.01)
*H02K 5/20* (2006.01)

(52) U.S. Cl.
CPC ....... *H02K 11/215* (2016.01); *H02K 2203/06* (2013.01)

(56) References Cited

U.S. PATENT DOCUMENTS

| | | |
|---|---|---|
| 2012/0212086 A1 | 8/2012 | Nagauama et al. |
| 2015/0351599 A1* | 12/2015 | Park ................... F04D 29/541 310/68 B |
| 2016/0094110 A1 | 3/2016 | Drye et al. |
| 2016/0149474 A1* | 5/2016 | Smith ................... H02K 7/145 310/68 B |
| 2018/0013325 A1* | 1/2018 | Jakob ................... H02K 5/203 |
| 2018/0163747 A1* | 6/2018 | Hayamitsu ............ F04D 29/582 |

FOREIGN PATENT DOCUMENTS

| | | |
|---|---|---|
| CN | 104094504 A | 10/2014 |
| CN | 104795958 A | 7/2015 |
| DE | 102013220495 | 4/2015 |
| EP | 1882294 B1 | 5/2012 |
| WO | WO2006123304 | 11/2006 |
| WO | WO2007/104894 | 9/2007 |
| WO | WO2010/116205 | 10/2010 |
| WO | WO2014/097109 | 6/2014 |
| WO | WO-2017008796 A1 * | 1/2017 ............. G01P 3/487 |

\* cited by examiner

END SHIELD FOR A BRUSHLESS ELECTRIC MOTOR

The present invention relates to a non-output-side end shield for a brushless electric motor, including a centrally arranged bearing seat for accommodating a non-output-side rotor bearing for a rotor shaft of the brushless electric motor. The present invention also relates to a brushless electric motor, which includes a non-output-side end shield.

BACKGROUND

Non-output-side end shields and brushless electric motors which include non-output-side end shields are generally known from the prior art. Non-output-side end shields are used, in particular, for accommodating and supporting a rotor shaft of the brushless electric motor. The latter must be adequately precisely positioned and aligned with respect to a stator laminated core of the brushless electric motor. At the same time, it is desirable that a sensor circuit board for detecting the rotational position of the rotor shaft, in turn, be adequately precisely positioned and aligned to facilitate a preferably exact commutation of the brushless electric motor.

SUMMARY OF THE INVENTION

It is an object of the present invention to provide a non-output-side end shield, which favors a precise positioning and alignment of a rotor shaft and a sensor circuit board.

The present invention provides that the non-output-side end shield includes a sensor receptacle, which is used as a carrier for a sensor circuit board for detecting the rotational position of the rotor shaft, the non-output-side end shield and the sensor receptacle being formed together as a one-part component.

In one particularly preferred embodiment, the non-output-side end shield includes three slide-in elements, spaced an equal distance apart, which are designed to be accommodated, at least in sections, in a slide-in opening, which corresponds to the particular slide-in element and belongs to a stator laminated core of the electric motor.

In this regard, it is recognized that a precise positioning and alignment of the non-output-side end shield with respect to the stator laminated core, the rotor shaft, the sensor circuit board and with regard to a sensor magnetic ring is a particular technical challenge. The necessary tolerances are typically very low, so that the precise positioning and alignment of the non-output-side end shield involves a great deal of time and thus money in the manufacture of a brushless electric motor.

In particular, it was recognized that an unavoidable chain of errors, which exceeds the required tolerances, may occur in a sequential assembly of individual components of the brushless electric motor, i.e., in particular when joining the non-output-side end shield to the stator laminated core, the rotor shaft, the sensor circuit board and the sensor magnetic ring. In particular, it has been shown that the matching of the sensor magnetic ring and the sensor circuit board are often negatively affected in non-output-side end shields according to the prior art. As a result, brushless electric motors according to the prior art which include conventional non-output-side end shields are frequently not optimally commutated.

The precise positioning and alignment of the described components are made significantly easier by the three slide-in elements, which are spaced an equal distance apart and are situated at the non-output-side end shield, the non-output-side end shield and the sensor receptacle being formed together as a one-part component.

It has been proven to be advantageous if the non-output-side end shield includes exactly three slide-in elements, spaced an equal distance apart, which are formed as a one-part component with the non-output-side end shield.

The non-output-side end shield may be manufactured from plastic, for example with the aid of injection molding. Alternatively, the non-output-side end shield may be manufactured from metal, for example from aluminum, preferably with the aid of milling.

It has proven to be advantageous if each of the slide-in elements has a radially oriented and preferably planar centering surface, which is provided for the concentric centering of the slide-in element with respect to the stator laminated core. The centering surface preferably abuts a radial supporting surface of the stator laminated core in the installed state.

In another preferred embodiment, each of the slide-in elements has two tangentially oriented and preferably planar centering surfaces, which are provided for the angular alignment of the slide-in element with respect to the stator laminated core. The planar centering surfaces preferably abut a particular tangential supporting surface of the stator laminated core in the installed state. Within the scope of the present invention, an angular alignment is understood to be an alignment of the non-output-side end shield with respect to the stator laminated core, the angle relating to the rotation direction of the rotor shaft.

In a likewise preferred embodiment, each of the slide-in elements has an axially oriented and preferably planar contact surface, which is provided for maintaining a defined axial position between the non-output-side end shield and the stator laminated core. The planar contact surface preferably abuts a preferably planar axial supporting surface of the stator laminated core in the installed state.

Within the scope of the present invention, an installed state is understood to be a state in which the non-output-side end shield is situated at a stator laminated core of the brushless electric motor; in other words, the brushless motor is ready for operation.

It has proven to be advantageous if the non-output-side end shield includes three holding elements spaced an equal distance apart. The holding elements preferably each form an elevation for a clamping screw, which is provided for connecting the non-output-side end shield to an output-side end shield.

It has been proven to be advantageous if the non-output-side rotor bearing is designed as a fixed roller bearing.

The present invention also provides a brushless electric motor, including a stator laminated core, an output-side end shield, a non-output-side end shield described above and a rotor shaft, which is supported in an output-side rotor bearing of the output-side end shield. The output-side rotor bearing is preferably designed as a movable roller bearing.

It has proven to be advantageous if the brushless electric motor includes a sensor circuit board accommodated in the sensor receptacle for detecting the rotational position of the rotor shaft. The sensor circuit board is preferably situated between the non-output-side end shield and the output-side end shield.

It has also proven to be advantageous if the sensor circuit board is situated between an underside of the end shield and the stator laminated core. An underside of the end shield should be understood to be the side of the end shield which faces the output-side end shield during proper operation.

An arrangement of the sensor circuit board between the non-output-side end shield and the output-side end shield has the advantage that a shorter total length of the brushless electric motor is achievable. For this purpose, a recess is preferably provided on the non-output-side end shield, in which the sensor circuit board and/or the sensor magnetic ring is/are accommodated or may be accommodated.

Alternatively to an arrangement of the sensor circuit board between the non-output-side end shield and the output-side end shield, the sensor circuit board may also be situated on a side of the non-output-side end shield facing away from the output-side end shield. The sensor magnetic ring may also be situated on the side of the non-output-side end shield facing away from the output-side end shield.

In this regard, it is recognized that the sensor circuit board and the sensor magnetic ring are shielded against an undesirable interference magnetic field of a coil winding of the stator. This results in an improved sensing of measured values by Hall sensors, which are preferably provided, on the sensor circuit board, which ultimately further improves the commutation of the brushless electric motor.

In another preferred embodiment, the brushless electric motor includes a fan situated on the output side.

Other advantages result from the following description of the figures. The figures illustrate different exemplary embodiments of the present invention. The figures, the description and the claims contain numerous features in combination. Those skilled in the art will advantageously also consider the features individually and combine them to form other reasonable combinations.

In the figures, identical and equivalent components are provided with identical reference numerals.

BRIEF DESCRIPTION OF THE DRAWINGS

FIG. 1);

DETAILED DESCRIPTION

Figure 1:
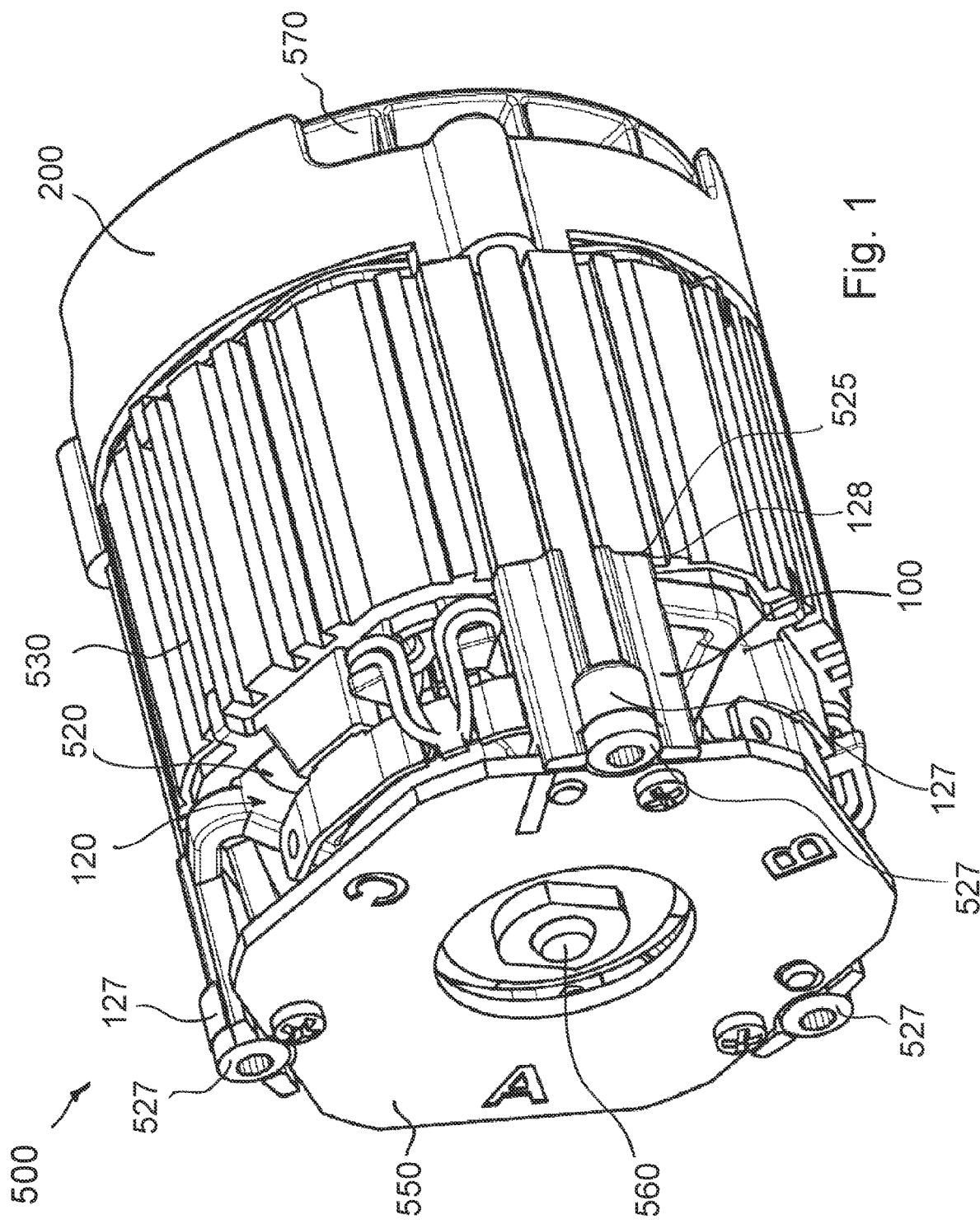
FIG. 1 shows a perspective representation of a preferred exemplary embodiment of a brushless electric motor.

FIG. 1 shows a preferred exemplary embodiment of brushless electric motor 500 according to the present invention. Brushless electric motor 500 includes a stator laminated core 530, an output-side end shield 200 and a centrally arranged rotor shaft 560. A fan 570 situated on the output side is also provided on brushless electric motor 500 in FIG. 1.

Since FIG. 1 shows a brushless electric motor 500 mounted ready for operation, non-output-side end shield 100 is not shown in its entirety. A more detailed explanation of non-output-side end shield 100 follows with reference to FIG. 2.

It is also apparent from FIG. 1 that a sensor circuit board 550 is accommodated on the side of non-output-side end shield 100 facing away from output-side end shield 200. Sensor circuit board 550 is used to detect the rotational position of rotor shaft 560.

Non-output-side end shield 100 includes three holding elements 127, spaced an equal distance apart, each of which forms an elevation for a clamping screw 527. Non-output-side end shield 100 and output-side end shield 200 are connected to each other with the aid of clamping screws 527.

Figure 2:
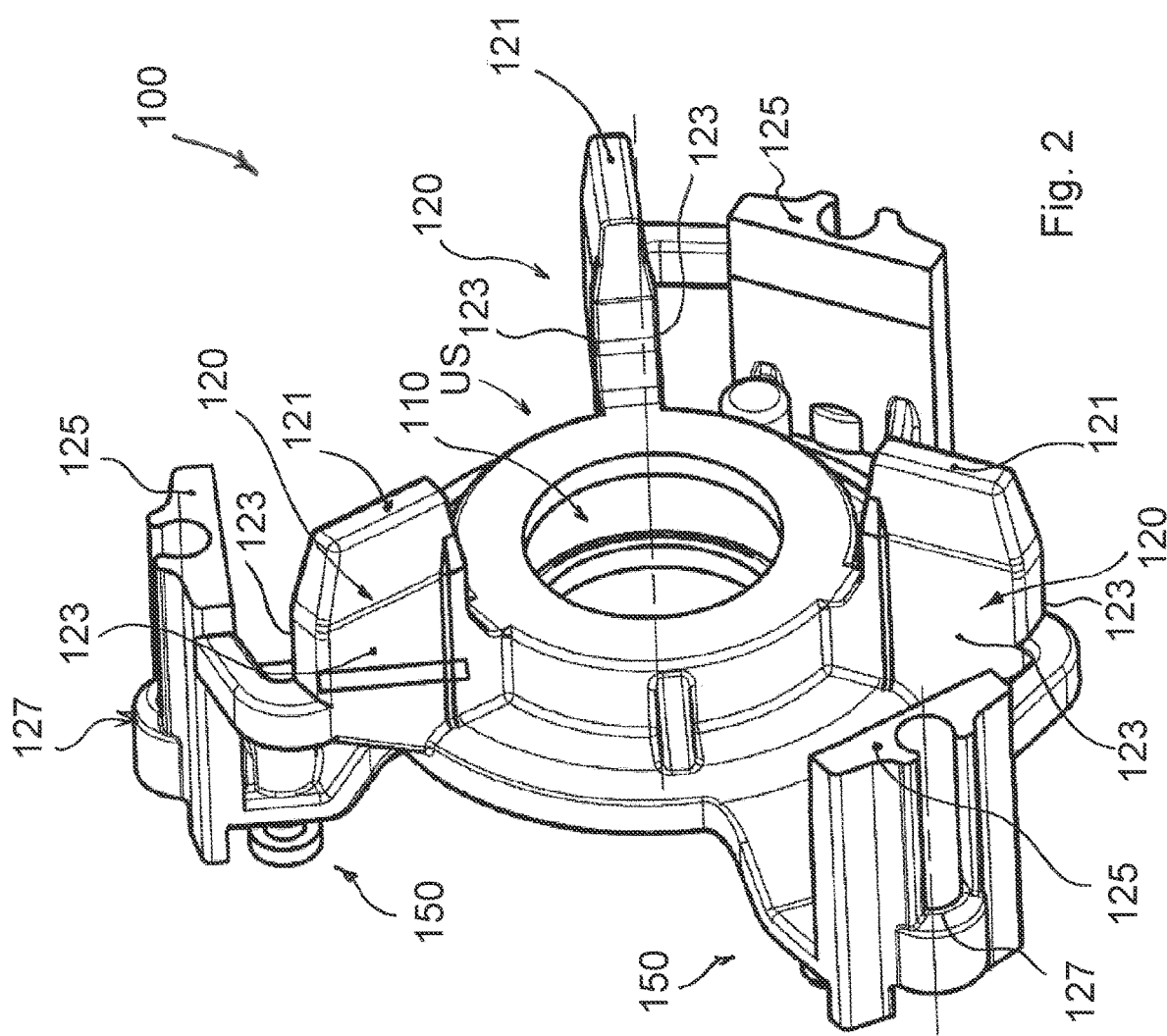
FIG. 2 shows a perspective representation of a preferred exemplary embodiment of a non-output-side end shield according to the present invention.

One of three slide-in elements 120, which are described below with reference to FIG. 2, are already indicated in FIG. 1.

FIG. 2 shows a preferred exemplary embodiment of a non-output-side end shield 100 according to the present invention. Non-output-side end shield 100 includes a sensor receptacle 150, which is used as a carrier for a sensor circuit board 550 (cf. FIG. 1). Non-output-side end shield 100 and sensor receptacle 150 are formed together as a one-piece component. In the exemplary embodiment illustrated in the present case, non-output-side end shield 100 is milled from a metal block.

As is apparent from FIG. 2, non-output-side end shield 100 includes exactly three slide-in elements 120 spaced an equal distance apart. Three slide-in elements 120, spaced an equal distance apart, are designed to be accommodated, at least in sections, in slide-in openings 520 corresponding to particular slide-in element 120 (cf. FIG. 6), which are formed in a stator laminated core 530.

Non-output-side end shield 100 in FIG. 2 has a large number of structurally formed surfaces, with which the precise positioning and alignment are made easier. These surfaces are described in greater detail below.

Figure 6:
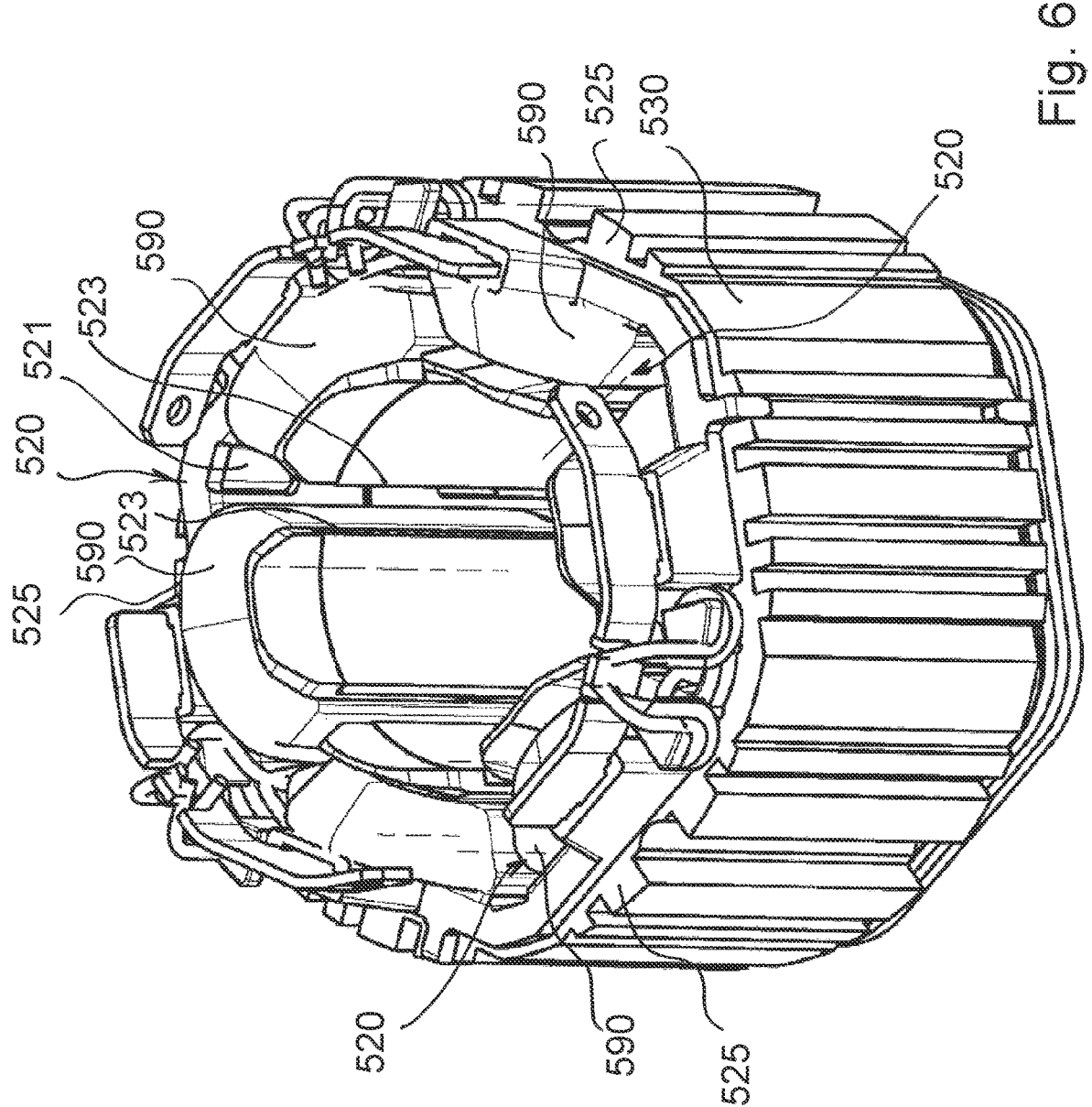
FIG. 6 shows a perspective representation of a stator laminated core of the brushless electric motor from FIG. 1.

First of all, each of slide-in elements 120 has a series of radially oriented and, in the present case, planar centering surfaces 121, which are provided for the concentric centering of slide-in element 120 with respect to stator laminated core 530 (cf. FIG. 6). In the installed state, each of planar centering surfaces 121 abuts a corresponding radial supporting surface 521 of stator laminated core 530 (cf. FIG. 6).

Each of slide-in elements 120 also has two tangentially oriented and, in the present case, planar centering surfaces 123. Planar centering surfaces 123 are used for the angular alignment of slide-in element 120 with respect to stator laminated core 530. In the installed state (cf. FIG. 5), planar centering surfaces 123 abut a particular tangential supporting surface 523 of stator laminated core 530.

Finally, each of slide-in elements 120 has an axially oriented and, in the present case, planar contact surface 125, which is provided for maintaining a defined axial position between non-output-side end shield 100 and stator laminated core 530. As is apparent from FIG. 1, planar contact surface 125 abuts a planar axial supporting surface 525 of stator laminated core 530.

Figure 3:
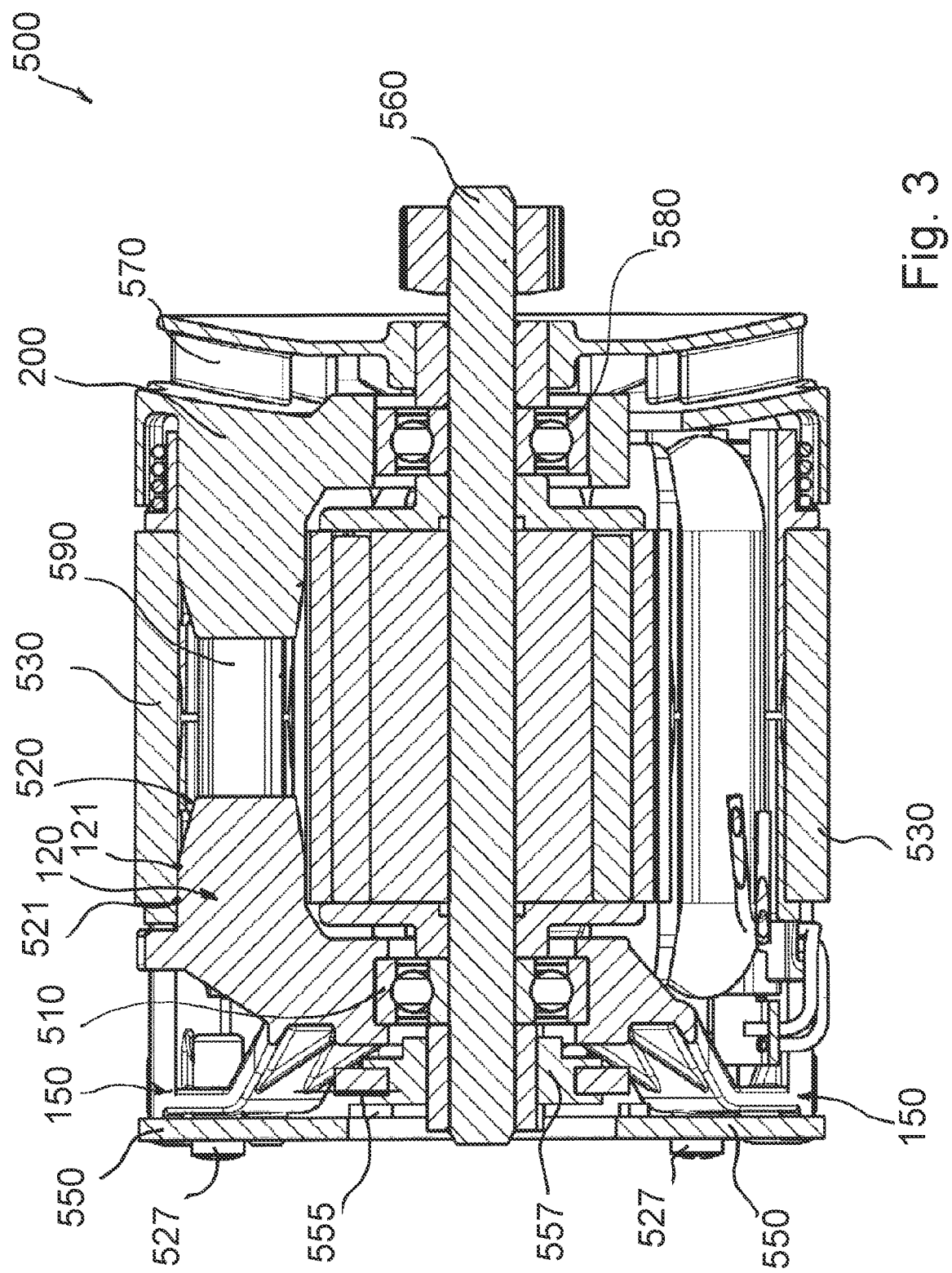
FIG. 3 shows a sectional representation of the brushless electric motor from FIG. 1.

FIG. 3 shows a sectional representation of brushless electric motor 500 from FIG. 1 in the longitudinal direction. As is apparent from FIG. 3, non-output-side end shield 100 includes a sensor receptacle 150, which is used as a carrier for sensor circuit board 550 for detecting the rotational position of rotor shaft 560. Non-output-side end shield 100 and sensor receptacle 150 are formed together as a one-piece component, which is apparent in the present case from the hatching.

A planar and radially oriented centering surface 121 of slide-in element 120 is particularly clearly apparent from FIG. 3, which is provided for the concentric centering of slide-in element 120 with respect to stator laminated core 530. In the installed state shown in FIG. 3, planar and radially oriented centering surface 121 is supported on a radial supporting surface 521 of stator laminated core 530.

In the exemplary embodiment illustrated in the present case, sensor circuit board 550 is a carrier of a Hall sensor 555, which interacts with a sensor magnetic ring 557 for the purpose of detecting the rotational position of rotor shaft 560.

As is also apparent from FIG. 3, sensor circuit board 550 is situated on a side of non-output-side end shield 100 facing away from output-side end shield 200. This ensures a certain shielding of Hall sensor 555 against a magnetic field effect of stator coil windings 590.

Rotor shaft 560 of brushless electric motor 500 in FIG. 3 is supported in a non-output-side rotor roller bearing 510 designed as a fixed roller bearing within non-output-side end shield 100. On the output side, rotor shaft 560 is supported in an output-side rotor bearing 580, output-side rotor bearing 580 being designed as a movable roller bearing.

Figure 4:
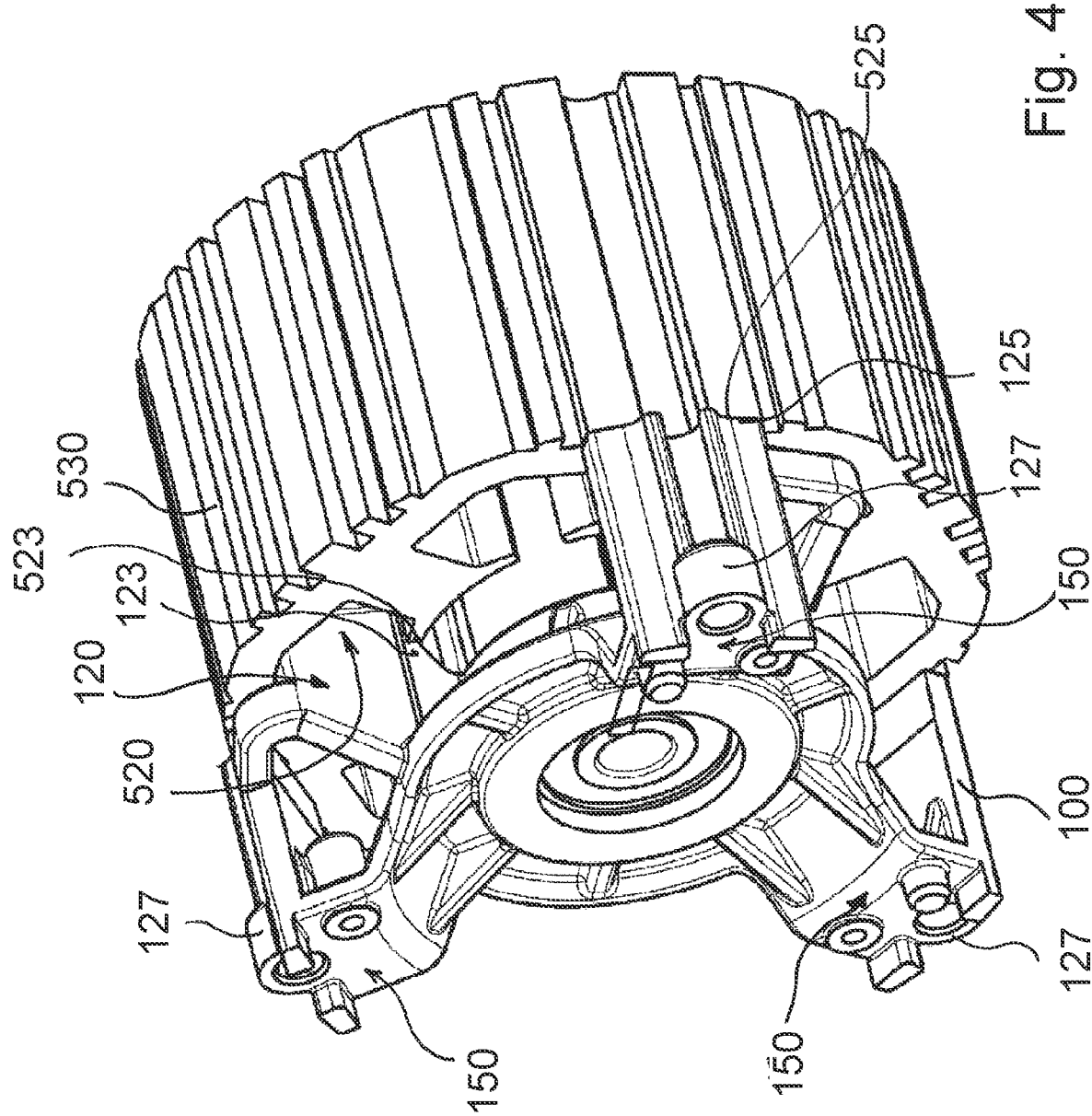
FIG. 4 shows the non-output-side end shield from FIG. 2, situated on a stator laminated core of a brushless electric motor (cf.

FIG. 4 optionally shows non-output-side end shield 100 in the installed state, i.e. situated on a stator laminated core 530. The one-part design of non-output-side end shield 100, including sensor receptacle 150, is clearly apparent here, as well as the exactly three slide-in elements 120 spaced an equal distance apart. It is also clearly apparent that, in the installed state, slide-in elements 120 are accommodated, at least in sections, in a corresponding slide-in opening 520, which is formed in stator laminated core 530.

Figure 5:
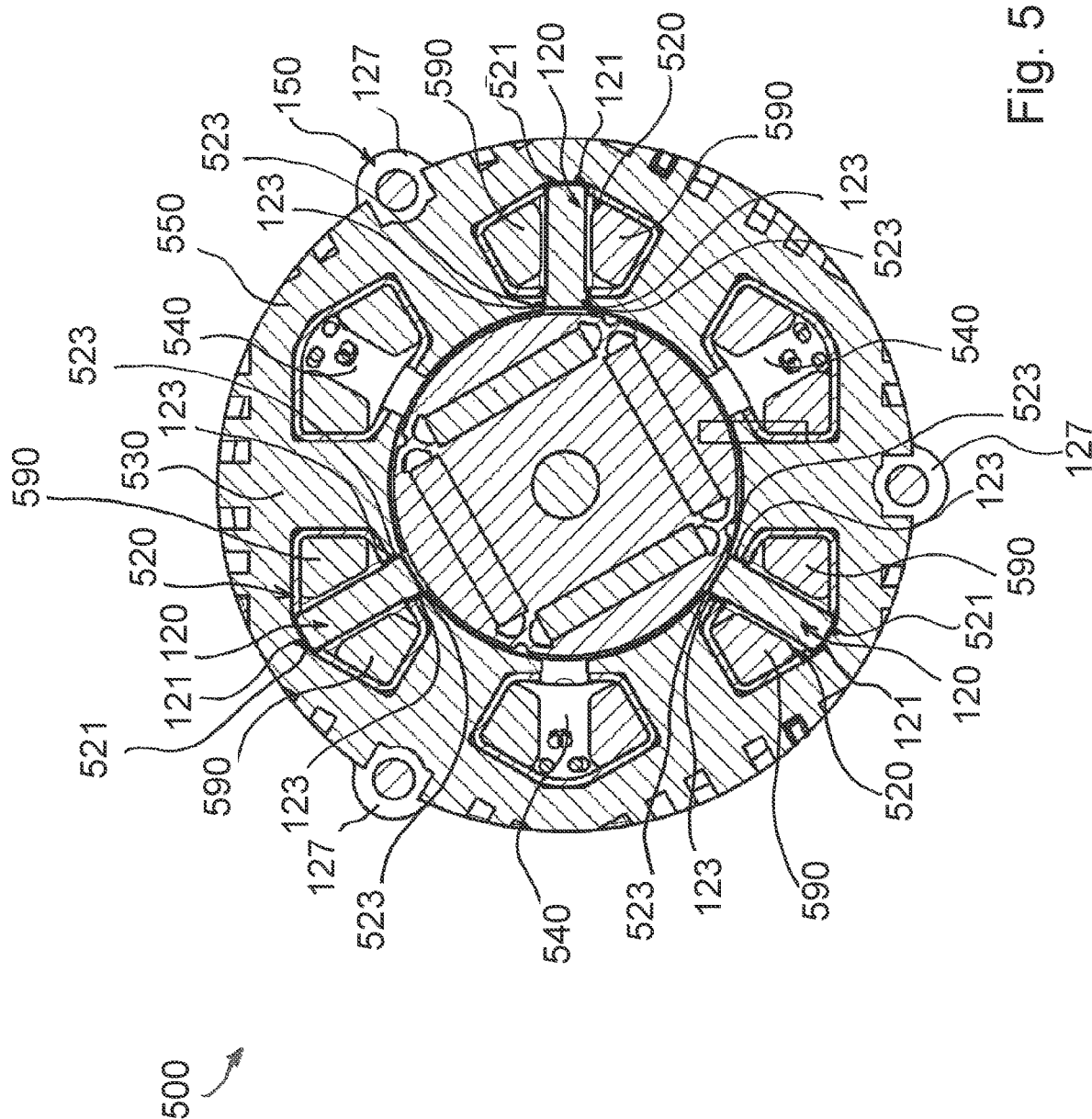
FIG. 5 shows another sectional representation of the brushless electric motor from FIG. 1.

FIG. 5 shows a cross-section of electric motor 500 for clarifying the centering of non-output-side end shield 100 in stator laminated core 530. Three slide-in elements 120, spaced an equal distance apart, are clearly apparent, which run within a volume of stator laminated core 530, which is clearly apparent due to the sectional representation. Radially oriented centering surfaces 121 are supported on a particular radial supporting surface 521 of stator laminated core 530.

Tangentially oriented, planar centering surfaces 123, provided on both sides of slide-in element 120, which are used for angular alignment, abut particular tangential supporting surfaces 523 of the stator laminated core. A particular pole tooth 540 of electric motor 500 is shown in the three openings of stator laminated core 530, in which no slide-in element 120 is situated.

Finally, FIG. 6 shows a perspective representation of stator laminated core 530. The exactly three corresponding slide-in elements, spaced an equal distance apart, are clearly apparent, into which slide-in elements 120 (cf. FIG. 2) are to be inserted.

In the exemplary embodiment illustrated in the present case, the stator laminated core includes exactly six stator coil windings 590, which run at an equal distance from each other along an inner circumference of stator laminated core 530. Three radially supporting surfaces 521, spaced an equal distance apart, are formed between two adjacent stator coil windings 590 in stator laminated core 530.

As is apparent from FIG. 6, the latter are formed as radial indentations within stator laminated core 530. A total of exactly three radial supporting surfaces 521 are provided.

Exactly six tangential supporting surfaces 523 are also formed in the exemplary embodiment in FIG. 6. They are situated on a particular section of stator laminated core 530, which delimits stator coil winding 590 toward the inside. Two adjacent tangential supporting surfaces 523 are each assigned to one of slide-in elements 120 (cf. FIG. 2).

Finally, planar axial supporting surface 525 is apparent on the outer circumference of stator laminated core 530, which functions as an elevation for planar contact surface 125 of slide-in elements 120 (cf. FIG. 2). Axial supporting surface 525 is formed by a planar end of stator laminated core 530.

LIST OF REFERENCE NUMERALS

100 non-output-side end shield
110 bearing seat
120 slide-in element
121 radially oriented centering surface
123 tangentially oriented centering surface
125 axially oriented contact surface
127 holding elements
150 sensor receptacle
200 output-side end shield
500 electric motor
510 non-output-side rotor bearing
520 corresponding slide-in opening
521 radial supporting surface
523 tangential supporting surface
525 axial supporting surface
527 clamping screw
530 stator laminated core
540 pole tooth
550 sensor circuit board
555 Hall sensor
557 sensor magnetic ring
560 rotor shaft
570 fan
580 output-side rotor bearing
590 stator coil winding
US underside of the end shield

What is claimed is:

1. A non-output-side end shield for a brushless electric motor, the non-output side shield comprising:
    a centrally arranged bearing seat for accommodating a non-output-side rotor bearing for a rotor shaft of the brushless electric motor;
    a sensor receptacle used as a carrier for a sensor circuit board for detecting a rotational position of the rotor shaft, the non-output-side end shield and the sensor receptacle being formed as a one-part component; and
    three slide-in elements, spaced an equal distance apart, and each of the three slide-in openings designed to be accommodated, at least in sections, in a particular one of three slide-in openings belonging to a stator laminated core of the electric motor.

2. The non-output-side end shield as recited in claim 1 wherein each of the slide-in elements has a radially oriented centering surface provided for the concentric centering of the slide-in element with respect to the stator laminated core and, in the installed state, abuts a radial supporting surface of the stator laminated core.

3. The non-output side end shield as recited in claim 2 wherein the centering surfaces are planar.

4. The non-output-side end shield as recited in claim 2 wherein the radially oriented centering surface provided for the concentric centering of the slide-in element with respect to the stator laminated core faces radially outwardly.

5. The non-output-side end shield as recited in claim 1 wherein each of the slide-in elements has two tangentially oriented centering surfaces provided for the angular alignment of the slide-in element with respect to the stator laminated core and, in the installed state, abut a particular tangential supporting surface of the stator laminated core.

6. The non-output side end shield as recited in claim 5 wherein the centering surfaces are planar.

7. The non-output-side end shield as recited in claim 1 wherein each of the slide-in elements has an axially oriented contact surface provided for maintaining a defined axial position between the non-output-side end shield and the stator laminated core and, in the installed state, abuts a axial supporting surface of the stator laminated core.

8. The non-output side end shield as recited in claim 7 wherein the contact and axial supporting surfaces are planar.

9. The non-output-side end shield as recited in claim 1 further comprising three holding elements, spaced an equal distance apart, each of which has an elevation for a clamping screw provided for connecting the non-output-side end shield to an output-side end shield.

10. The non-output-side end shield as recited in claim 1 wherein the non-output-side rotor bearing is designed as a fixed roller bearing.

11. A brushless electric motor comprising:
a stator laminated core having the three slide-in openings;
an output-side end shield;
a non-output-side end shield as recited in claim 1 wherein the each of the three slide-in elements is accommodated in the particular one of the three slide in openings; and
a rotor shaft supported in an output-side rotor bearing of the output-side end shield, the output-side rotor bearing being designed as a movable roller bearing.

12. The brushless electric motor as recited in claim 11 further comprising a sensor circuit board accommodated in the sensor receptacle and for detecting the rotational position of the rotor shaft, the sensor circuit board being situated between the non-output-side end shield and the output-side end shield.

13. The brushless electric motor as recited in claim 12 wherein the sensor circuit board is situated between an underside of the end shield and the stator laminated core.

14. The brushless electric motor as recited in claim 11 further comprising a fan situated on the output side.

15. The brushless electric motor as recited in claim 11 wherein the stator laminated core has three further openings, a pole tooth of the motor being located in at least one of the further openings.

16. The brushless electric motor as recited in claim 11 wherein the slide-in openings of the stator laminated core have radially inwardly facing support surfaces.

17. The brushless electric motor as recited in claim 11 wherein each of the slide-in elements has a radially outwardly oriented centering surface provided for the concentric centering of the slide-in element with respect to the stator laminated core and, in the installed state, abuts a radial supporting surface of the stator laminated core, the radial supporting surface facing radially inwardly.

18. The non-output-side end shield as recited in claim 1 wherein exactly three slide-in elements are present.

19. A brushless electric motor comprising:
a rotor shaft;
a stator laminated core;
an output-side end shield having an output-side bearing;
a non-output-side rotor bearing for the rotor shaft;
a non-output-side end shield, the non-output side shield including a centrally arranged bearing seat for accommodating the non-output-side rotor bearing; and
a sensor receptacle used as a carrier for a sensor circuit board for detecting a rotational position of the rotor shaft, the non-output-side end shield and the sensor receptacle being formed as a one-part component;
the output-side rotor bearing being designed as a movable roller bearing.

20. The brushless electric motor as recited in claim 19 wherein the non-output-side rotor bearing is a fixed roller bearing.

* * * * *